United States Patent [19]

Manico et al.

[11] Patent Number: 5,400,152
[45] Date of Patent: Mar. 21, 1995

[54] HIGH SPEED INDEX PRINTER

[75] Inventors: Joseph A. Manico, Rochester; David L. Patton, Webster; Thomas R. Roule, Mendon, all of N.Y.

[73] Assignee: Eastman Kodak Company, Rochester, N.Y.

[21] Appl. No.: 79,658

[22] Filed: Jun. 18, 1993

[51] Int. Cl.$^6$ .................. H04N 1/04; H04N 1/23; H04N 1/46; G03B 27/32; G03B 27/80

[52] U.S. Cl. ..................... 358/501; 358/506; 358/401; 358/487; 358/302; 355/64; 355/68; 355/35; 355/38; 347/226

[58] Field of Search ........... 358/501, 506, 401, 487, 358/302, 296, 450, 451, 528, 540, 509; 355/35, 38, 54, 64, 68, 46; 346/107 R, 110 R, 108; 283/36

[56] References Cited

U.S. PATENT DOCUMENTS

| | | |
|---|---|---|
| 4,162,848 | 7/1979 | Platt, III .................. 355/46 |
| 4,511,929 | 4/1985 | Maeda et al. ............. 358/296 |
| 4,627,719 | 12/1986 | Nitsch et al. ............. 355/41 |
| 4,903,068 | 2/1990 | Shiota ....................... 355/38 |
| 4,933,773 | 6/1990 | Shiota et al. ............. 358/302 |
| 4,942,462 | 7/1990 | Shiota ....................... 358/509 |
| 4,990,950 | 2/1991 | Tokuda ..................... 355/38 |
| 5,068,742 | 11/1991 | Oshikoshi et al. ........ 355/46 |
| 5,182,594 | 1/1993 | Hopson ..................... 355/38 |
| 5,184,227 | 2/1993 | Foley ........................ 358/302 |
| 5,210,570 | 5/1993 | Minamisawa et al. .... 355/38 |

*Primary Examiner*—Scott A. Rogers
*Attorney, Agent, or Firm*—David A. Howley

[57] ABSTRACT

An apparatus that produces digitally generated index prints and normal optical prints as part of the normal printing operation, without requiring the negatives to be cut and handled separately. The foregoing is accomplished by using the exposure determination and subject classification data generated for the normal optical printing operation to rapidly provide the low resolution digital data for creating the individual index print images, during the normal optical printing operation. While the digital images are being created, each digital image is being simultaneously corrected for its own exposure requirement.

8 Claims, 5 Drawing Sheets

HIGH SPEED INDEX PRINTER

FIELD OF THE INVENTION

This invention relates generally to the field of photofinishing and particularly to a system for producing photographic prints and currently producing digital index print.

BACKGROUND OF THE INVENTION

Most photographs are produced by: exposing a film to light; developing the film to produce a negative; and processing (printing) the negative to produce a photographic print. The dark areas in the negative allow little light to pass so that the tones in the print appear light as they did in the original scene. Also the negatives from most color films have an overall orange color, and are smaller than the print. Thus, even when the negatives and prints for one or more processed rolls of film are together, it is difficult for an amateur photographer who is not trained to view photographic negatives to determine the negative that was used to produce a specific print.

An amateur photographer may receive the negatives and prints for one or more rolls of processed film in an envelope having two compartments. The negatives are usually placed in one compartment and the prints are usually placed in the other compartment. Some of the prints may be: given away; placed in a photo album; framed; or become separated from the negatives. The envelopes maybe haphazardly thrown in a box and mixed with other envelopes in the box. Thus, when someone wants to order reprints or enlargements of one or more prints it may be difficult to locate the negatives that correspond to the prints that they want to order.

When the prints and negatives are packaged together in an envelope, the negatives are susceptible to scratching and contamination from dust, dirt and/or fingerprints because the envelope does not provide a damage-free environment for the negatives. The various forms of negative damage mentioned above will reduce the quality of the reprints and enlargements that are made from the negatives.

Sometimes an amateur photographer or the photofinisher places the negatives in wax or plastic sleeves to protect and store the negatives and accidentally damages the negatives as they are inserted into the sleeves. This provides protection for the negatives but does not provide for easy identification of the negatives. In the past contact prints have been made to provide a convenient way to identify negatives by providing a page of positive images that have the same size on the contact print as the negative images on the film. This is done by cutting a length of negatives into individual strips. The strips are then arranged on a sheet of photographic paper or placed in transparent sleeves and then held in contact with the photographic paper with a glass plate, negative holder or negative gate, etc. An alternative method of producing sheets that contain images of the negatives involves optical printing. Multiple negatives are placed in a negative holder and are exposed on photosensitive paper with a photographic enlarger or photographic printer. This technique would allow reduction or enlargement of the images or images appearing on the paper by changing the magnification of the enlargement lens. Typically, the above sheets, referred to as proof sheets or index sheets were stored in a binder interleaved with sleeved negatives. Often times the negatives were printed while the negatives were in a transparent sleeve.

During the exposure of the index print, a group of negatives are simultaneously exposed with an amount of light that represents the average requirements of the group of negatives. This technique provides no opportunity to correct for the exposure requirement of individual negatives. An alternate technique to optically produce index prints uses a cluster lens array with each lens equipped with a shutter mechanism.

PROBLEMS TO BE SOLVED BY THE INVENTION

One of the disadvantages in using contact prints is that the negatives must be cut into strips and arranged on the photosensitive material prior to exposure. Another disadvantage is that there was no individual exposure compensation available for each negative. An additional disadvantage was that the image produced could not be reduced or enlarged from the size of the arrangement of photographic negatives.

One of the disadvantages of enlarger optical printing or photographic printer printing is that the negatives must be cut into individual strips and arranged in the negative holder prior to exposure. Another disadvantage of enlarger optical printing is that no individual exposure compensation is available for each negative. The reason for this is that the negatives are all exposed simultaneously.

The cluster lens technique does provide individual exposure correction but is time consuming in that each negative must be advanced into the printing gate and exposed one negative at a time. An index print depicting 24 images would require 24 individual exposures. Equipment required to produce index prints by optical techniques would be difficult if not impossible to retrofit into existing high speed printing equipment and systems.

In addition all of the above procedures require that the index print be printed separately from the standard printing of the negatives. Thus, the negatives must be handled once to produce the index print and once to produce the prints. Hence, with all the above techniques a separate handling and printing operation is required.

It is also apparent that conventional optical techniques are inappropriate for producing large volumes of index prints at high speed with individually corrected images.

SUMMARY OF THE INVENTION

The present invention overcomes the disadvantages of the prior art by providing a apparatus for automatically producing index prints by utilizing low resolution digital data that is currently used for exposure determination and subject classifications of negatives to generate an index image. This digital index data would be gathered during normal printer operation and stored off-line on a computer. Then the data will be exposure corrected, digitally compiled into the appropriate index print format and digitally printed. The index prints may be printed off-line by a digital printer at the same time the photographic prints are printed or may be printed as part of the normal printing operation having the index printer as part of the normal printing operation, producing the prints as the last prints of the order.

The foregoing is achieved by providing: an apparatus for exposing digital images and optical images on the same web of photosensitive media. The apparatus is characterized by: means for scanning photographic images, that appear on a photographic media, to create a digital representation of the photographic images; means coupled to the scanning means for optically exposing, via a first printing path with a lens and light source controlled by the scanning means, the photographic images scanned by the scanning means on the web of the photosensitive media; and means coupled to the scanning means for exposing via a second printing path a digital image on the web of photosensitive media by utilizing the digital representation of the photographic images.

ADVANTAGEOUS EFFECTS OF THE INVENTION

This invention overcomes the disadvantages of the prior art by providing a apparatus that produces digitally generated index prints and normal optical prints as part of the normal printing operation, without requiring the negatives to be cut and handled separately. The foregoing is accomplished by using the exposure determination and subject classification data generated for the normal optical printing operation to rapidly provide the low resolution digital data for creating the individual index print images, during the normal optical printing operation. While the digital images are being created, each digital image is being simultaneously corrected for its own exposure requirement. This insures that each individual image on the index print is properly exposed. The foregoing permits all of the digitally created images to be printed at the same time as one or more prints. At this time the index print or prints may be annotated with additional information. This invention permits one to add an index printer to existing optical printing equipment to enable one to simultaneously produce optical prints and index prints on the same web.

An additional advantage of the invention is that an individual negative or a plurality of individual negatives are only handled once to produce an optical print and a digitally generated index print. Thus, the handling of the negatives is reduced, which in turn reduces the cost to produce an index print. A further advantage of this invention is that a CRT may be utilized in conjunction with conventional high speed optical printing equipment to produce large volumes of optical prints and large volumes of index prints at high speed with individually corrected images. This permits one to easily combine the printing of the optical prints and the printing of the digital index prints into one printing operation. Thus, eliminating the need for extra handling of the negatives, optical prints and index prints.

DETAILED DESCRIPTION OF THE INVENTION

Figure 1:
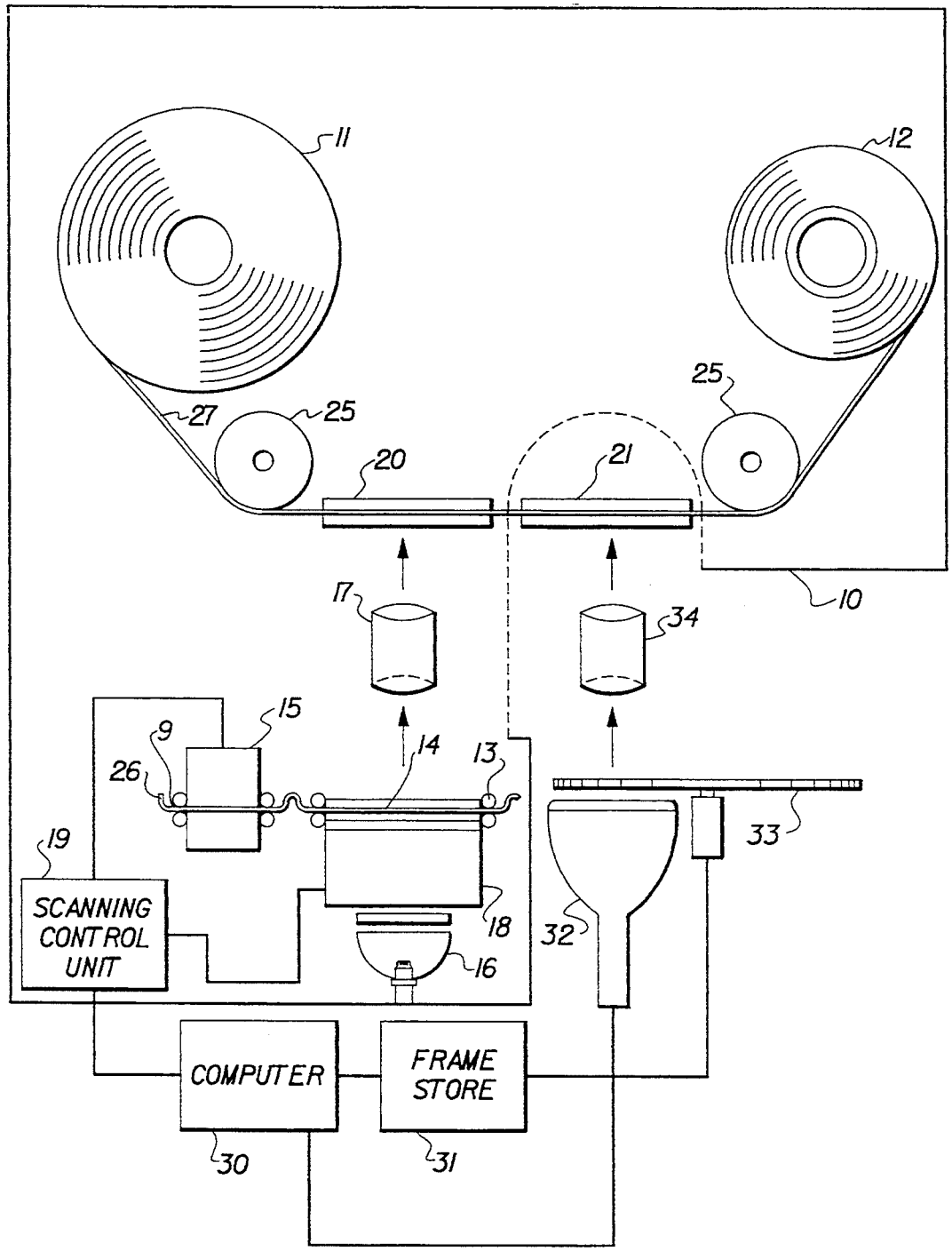
FIG. 1 is a block diagram showing the simultaneous printing of an optical print and a digital index print on the same surface of a photosensitive material.

Referring now to the drawings in detail and more particularly to FIG. 1, the reference character 10 represents a typical optical printer, i.e., a Kodak Clas 35 Printer, a Kodak 3510 Printer, a Kodak 312 Printer, or a Kodak System 50 Mini Lab. The above printers are manufactured by Eastman Kodak Company. Printer 10 comprises a motorized paper supply 11; a motorized paper take up 12; a negative transport system 13; a negative printing mask 14; a film scanner 15; a lamp house 16; an imaging lens 17; an optical exposure control unit 18; a scanning logic control unit 19; and a paper mask 20.

Photographic negatives 26, that includes a plurality of negative frames 9, moves through scanner 15 and negative printing mask 14. Scanner 15 scans each negative frame 9 individually that appears on photographic negatives 26 and produces a matrix of red, green and blue density measurements of each individual negative frame 9. Negatives 26 are comprised of a plurality of individual negative frames 9 that represent a plurality of rolls or strips of film. There may be 12, 24, 36, etc., negative frames 9 on an individual roll or strip of film. Negatives 26 may contain a plurality of rolls of film.

Scanner 15 may be an area array charged coupled device, a high resolution linear array, or a off axis array and lens system. The above density measurements are used to calculate the appropriate exposure control values for each individual negative frame 9. The above calculated exposure control values are transmitted to unit 18, where the exposure control values are used to adjust the exposure of each individual negative frame 9 on negatives 26, as the negatives 26 are exposed through lens 17 onto photosensitive media 27 to produce an optical image.

The matrix of density measurements that have been obtained by scanner 15 is also utilized to provide digital representations of the optical images that appear as the negative frames 9 on negatives 26. The digital image data obtained from scanner 15 is transmitted to computer 30, via scanning control unit 19. Computer 30 is coupled to frame store 31. Computer 30 and frame store 31 are coupled to CRT printer 32 and filter wheel 33. Computer 30 converts the digital data received from scanner 15 into digital representations of the images appearing on the negative frames 9 of negatives 26.

Computer 30 continues to collect the above images until all the images that represent an individual roll of film comprised of 26 are collected. Computer 30 collects the images and arranges the images into a matrix format. Frame store 31 stores the above digital representation and transmits the digital representations to CRT printer 32. Computer 30 may also contain digital resizing algorithms (Photoshop Software) such as those produced by Adobe of 1585 Charleston Road, P.O. Box 7900 Mountain View California 94039-7900, to resize digital images.

CRT printer 32 is a monochromatic CRT. Color exposures on CRT 32 are created, by exposing a red, green, and blue image of the digital representation of the images appearing on negatives 26 serially on CRT 32, by passing those images through filter wheel 33 and print mask 21. The red, green and blue images are imaged through lens 34 onto photosensitive media 27. One skilled in the art would be aware that other digital printing devices such as linear arrays, LED's, and laser printers etc. may be substituted for CRT 32.

Photosensitive media 27 is advanced from motorized paper supply 11 and metered into paper mask 20 by paper metering rollers 25. When exposure of an individual negative on negatives 26 is completed, exposed media 27 is advanced out of paper mask 20, by paper metering rollers 25.

Figure 2:
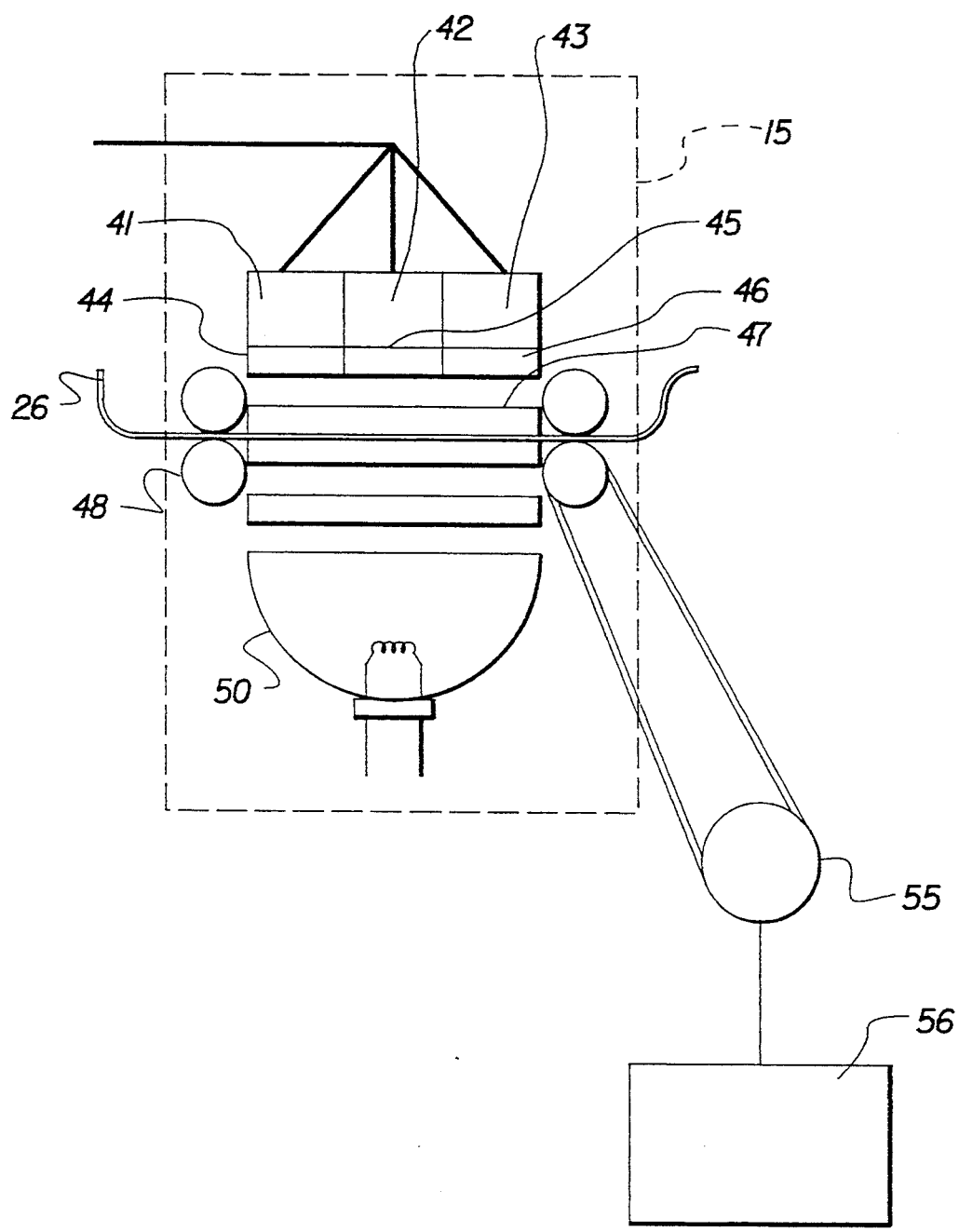
FIG. 2 is a block diagram showing an in line linear array utilized as scanner 15.

FIG. 2 is a block diagram showing an in line linear array utilized as scanner 15. Scanner 15 includes: in line array assembly 40; film gate 47; film drive 48; and light source 50. Assembly 40 comprises: three light sensing arrays 41, 42 and 43. Arrays 41, 42 and 43 may be any linear array charged coupled device(CCD) or similarly configured light sensing elements. Red, green and blue filters 44, 45 and 46 respectively are in the optical path of arrays 41, 42 and 43.

Negatives 26 are precisely driven through film gate 47 by film drive 48. Drive 48 is controlled by stepper motor 55 and stepper motor controller 56. As negatives 26 are driven through gate 47, negatives 26 are illuminated by light source 50 and sampled by linear arrays 41, 42 and 43, as the light from source 50 respectively passes through filters 44, 45 and 46.

A digital representation of the information appearing on the portion of media 27, being passed through gate 47, was created by the electrical signals generated by arrays 41, 42 and 43 and the film position information derived from stepper motor controller 56.

Figure 3:
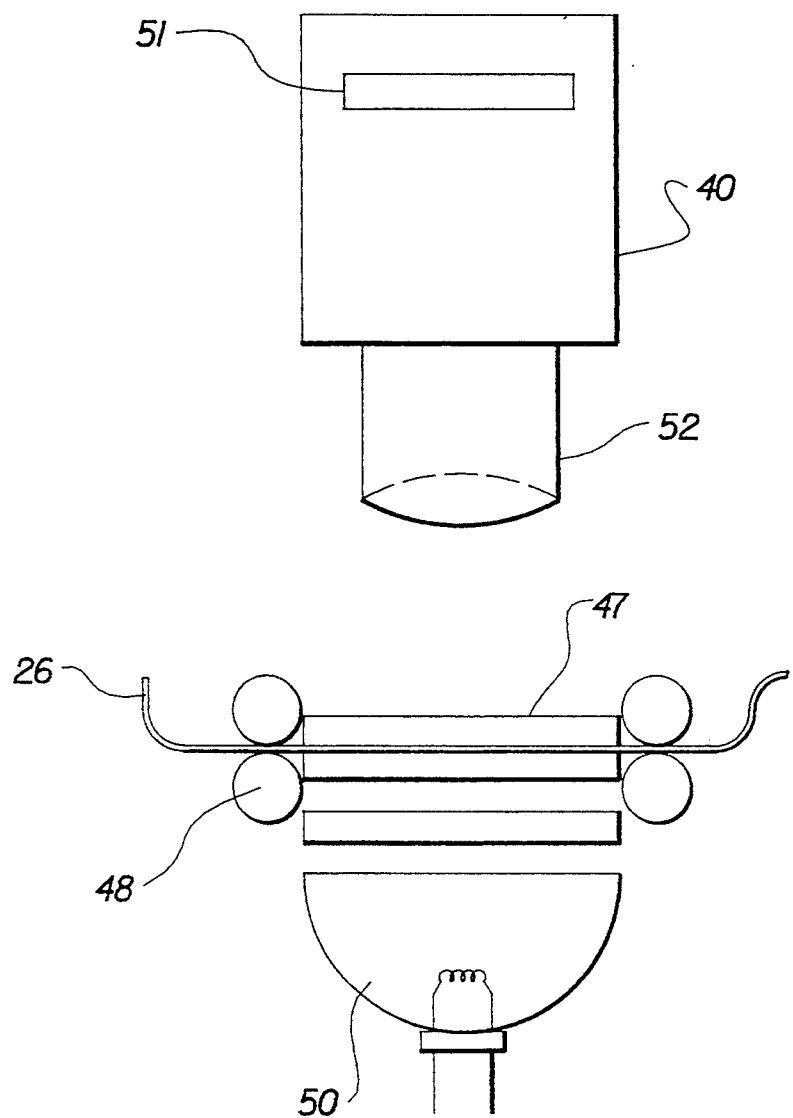
FIG. 3 is a block diagram showing an area array utilized as scanner 15.

FIG. 3 is a block diagram showing an area array utilized as scanner 15. Scanner 15 includes: array assembly 40; film gate 47; film drive 48; and light source 50. Assembly 40 comprises: area array 51 and lens 52. Array 51 may be any color CCD similar to those used in video cameras.

Negatives 26 are driven through film gate 47 by film drive 48. As negatives 26 are driven through gate 47, negatives 26 are illuminated by light source 50 and sampled by array 51 through lens 52.

A digital representation of the information appearing on an individual frame 9 of negatives 26, being positioned in gate 47, was created by the electrical signals generated by arrays 51 through lens 52. Thus, a complete negative frame 9 is exposed at a given time.

Figure 4:
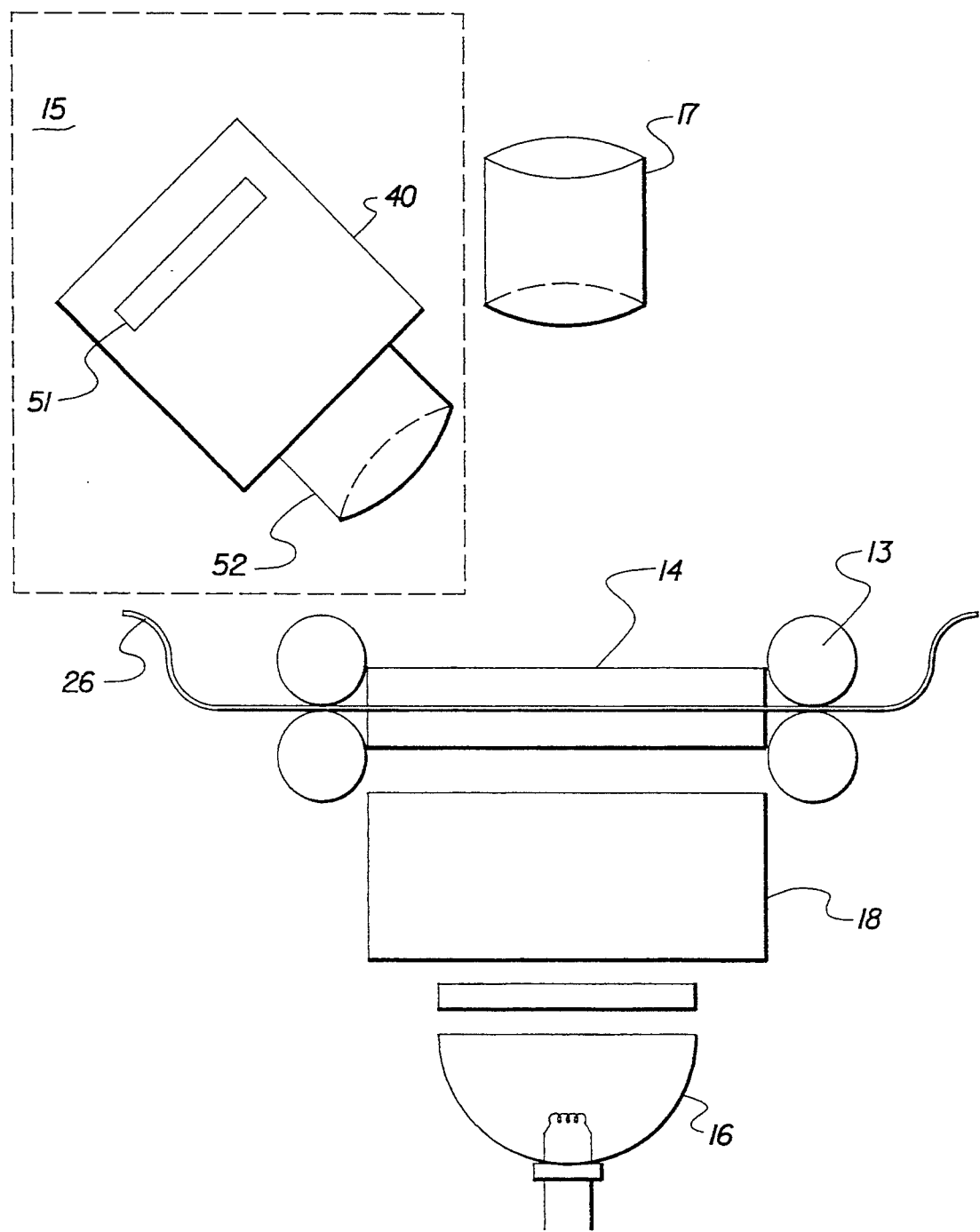
FIG. 4 is a block diagram showing an off axis CCD area array utilized as scanner 15.

FIG. 4 is a block diagram showing an off axis array utilized as scanner 15. Scanner 15 includes off axis array assembly 40. Assembly 40 comprises: area array 51 and lens 52. Array 51 may be any color CCD device similar to those used in cameras. Scanner 15 is mounted off the printing axis of printing lens 17.

Negatives 26 are driven through negative printing mask 14 by negative transport system 13. Scanner 15 scans an individual negative frame 9, positioned in negative printing mask 14, prior to the printing exposure through lens 17 onto media 27 (shown in FIG. 1). Lamp 16 and exposure control 18 are used to properly expose the individual frame 9 positioned in printing mask 14. After the exposure is complete, transport system 13 advances the next individual frame 9 into printing mask 14 and the above process is repeated.

Figure 5:
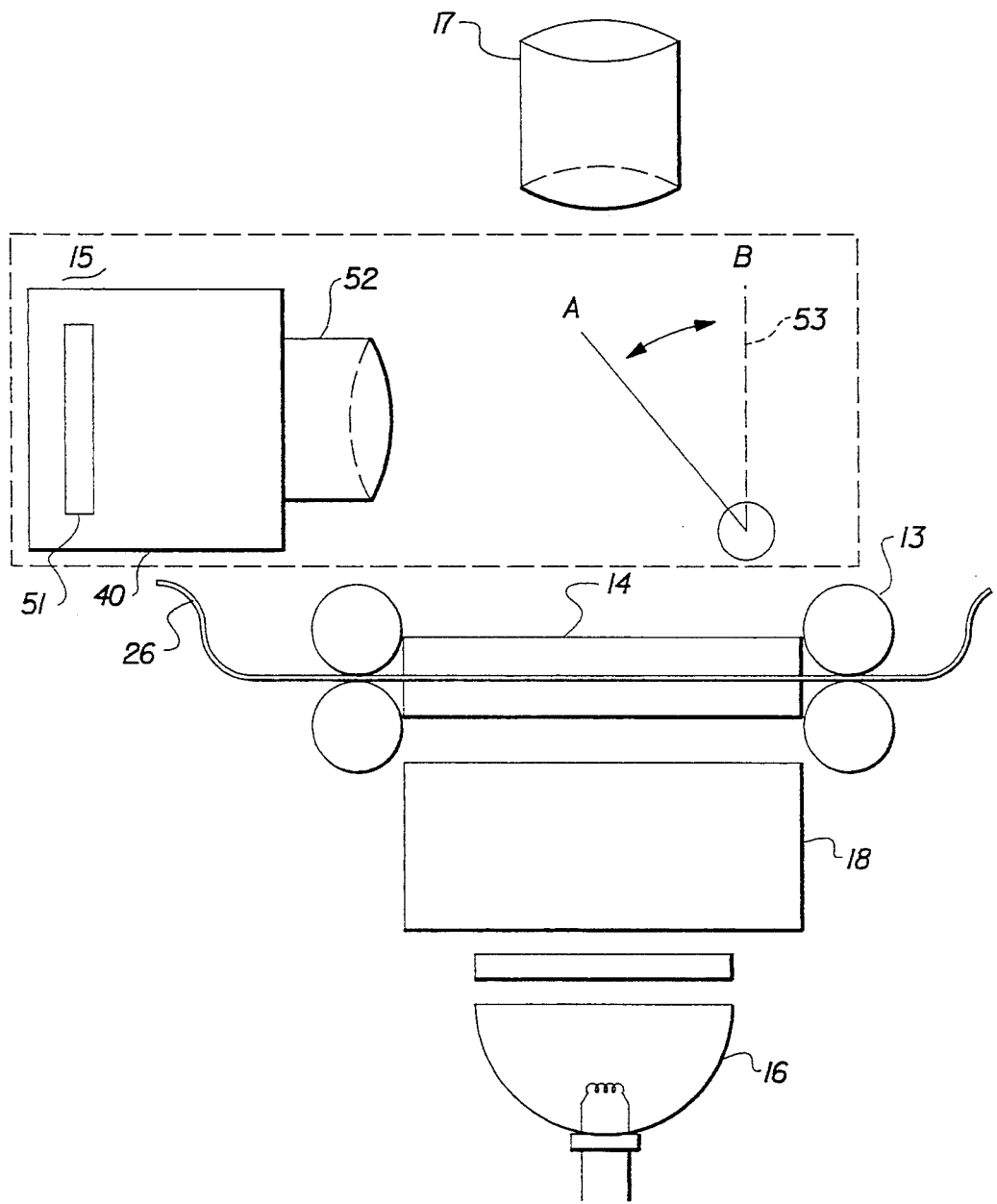
FIG. 5 is a block diagram showing an area array CCD and a two position front surface mirror 53 utilized as scanner 15.

FIG. 5 is a block diagram showing an area array CCD and a two position front surface mirror 53 utilized as scanner 15. Scanner 15 includes area array assembly 40 and two position front surface mirror 53. Assembly 40 comprises: area array 51 and lens 52. Array 51 may be any color CCD device similar to those used in cameras. Scanner 15 is mounted off the printing axis of printing lens 17.

Negatives 26 are driven through negative printing mask 14 by negative transport system 13. With mirror 53 located in position A, scanner 15 scans an individual negative frame 9, positioned in negative printing mask 14. After scanning an individual frame 9, mirror 53 moves to position B and printing exposure occurs through lens 17 onto media 27 (shown in FIG. 1). Lamp 16 and exposure control unit 18 are used to properly expose the individual frame 9 positioned in negative printing mask 14. After the exposure is completed, transport system 13 advances the next individual frame 9 into negative printing mask 14 and mirror 53 returns to position A to repeat the above process.

The above specification describes a new and improved high speed printer. It is realized that the above description may indicate to those skilled in the art additional ways in which the principles of this invention may be used without departing from the spirit. It is, therefore, intended that this invention be limited only by the scope of the appended claims.

| | Parts List |
|---|---|
| 9 | negative frames |
| 10 | optical printer |
| 11 | motorized paper supply |
| 12 | motorized paper takeup |
| 13 | negative transport system |
| 14 | negative printing mask |
| 15 | film scanner |
| 16 | lamp house |
| 17 | imaging lens |
| 18 | optical exposure control unit |
| 19 | scanning logic control unit |
| 20 | paper mask |
| 21 | print mask |
| 25 | paper metering rollers |
| 26 | photographic negatives |
| 27 | photographic media |
| 30 | computer |
| 31 | frame store |
| 32 | CRT printer |
| 33 | filter wheel |
| 34 | lens |
| 40 | line array assembly |
| 41 | light sensing arrays |
| 42 | light sensing arrays |
| 43 | light sensing arrays |
| 44 | red filters |
| 45 | green filters |
| 46 | blue filters |
| 47 | film gate |
| 48 | film drive |
| 50 | light source |
| 51 | area array |
| 52 | lens |
| 53 | mirror |
| 55 | stepper motor |
| 56 | stepper motor controller |

What is claimed is:

1. An apparatus for exposing digital images and optical images on the same web of photosensitive media, said apparatus characterized by:
    means for scanning photographic images, that appear on a photographic media, to create a digital representation of the photographic images;
    means coupled to said scanning means for optically exposing, via a first printing path with a lens and light source controlled by said scanning means, the photographic images scanned by said scanning means on the web of the photosensitive media; and means coupled to said scanning means for exposing a digital image via a second printing path, completely separate from said first printing path, on the web of photosensitive media by utilizing the digital representation of the photographic images.

2. The apparatus claimed in claim 1, wherein said scanning means comprises: a scanner having a resolution that is matched to the output resolution of said exposing means so that the individual digital images exposed on the web will have the same resolution on the web as the individual digital representations of the photographic images.

3. The apparatus claimed in claim 1, wherein said scanning means comprises:
a scanner having a resolution that is lower than the output resolution of said exposing means; and
digital resizing means coupled to the output of said scanner for matching the output resolution of said scanner to the output resolution of said digital exposing means.

4. The apparatus claimed in claim 1, wherein said scanning means comprises:
a in line linear array;
means coupled to said array and said photographic media for moving said photographic media passed said linear array; and
an independent light source coupled to said array.

5. The apparatus claimed in claim 1, wherein said scanning means comprises:
a in line linear array;
means coupled to said array and said photographic media for moving said linear array passed said photographic media; and
an independent light source coupled to said array.

6. The apparatus claimed in claim 1, wherein said scanning means comprises:
a color area array; and
a independent light source coupled to said array.

7. The apparatus claimed in claim 1, wherein said scanning means comprises:
a area array scanner that is positioned off the axis of said light source.

8. The apparatus claimed in claim 1, wherein said scanning means comprises:
a area array scanner that is positioned off the axis of said light source; and
a mirror that has a first position which is located out of the axis of said light source and a second position which is located in the axis of said light source so that the photographic images on said photographic media is projected onto said area array.

* * * * *